(12) United States Patent
Mathleu et al.

(10) Patent No.: US 7,008,091 B2
(45) Date of Patent: Mar. 7, 2006

(54) ELECTROMAGNETIC RADIATION ASSEMBLY

(75) Inventors: Daniel J. Mathleu, Sheboygan Falls, WI (US); Daniel R. Todd, Sheboygan, WI (US)

(73) Assignee: K.W. Muth Company, Inc., Sheboygan, WI (US)

( * ) Notice: Subject to any disclaimer, the term of this patent is extended or adjusted under 35 U.S.C. 154(b) by 55 days.

(21) Appl. No.: 10/741,748

(22) Filed: Dec. 18, 2003

(65) Prior Publication Data

US 2005/0134953 A1    Jun. 23, 2005

(51) Int. Cl.
*B60Q 1/26* (2006.01)

(52) U.S. Cl. .................. 362/494; 362/498; 362/514; 362/297

(58) Field of Classification Search ............... 362/494, 362/498, 514, 297
See application file for complete search history.

(56) References Cited

U.S. PATENT DOCUMENTS

| | | |
|---|---|---|
| 32,576 A | 1/1861 | Pastore |
| 1,456,950 A | 5/1923 | Switch |
| 2,060,401 A | 11/1936 | Smith |
| 2,180,610 A | 11/1939 | Ritz-Woller |
| 2,190,123 A | 2/1940 | Pace |
| 2,263,382 A | 11/1941 | Gotzinger |
| 2,580,014 A | 12/1951 | Gazda |
| 2,595,331 A | 5/1952 | Calihan et al. |
| 3,040,207 A | 6/1962 | Grontkowski |
| 3,266,016 A | 8/1966 | Maruyama et al. |
| 3,280,701 A | 10/1966 | Donnelly et al. |
| 3,436,758 A | 4/1969 | Kluth |
| 3,449,626 A | 6/1969 | De Coye De Castelet |
| 3,532,871 A | 10/1970 | Shipman |
| 3,543,018 A | 11/1970 | Barcus et al. |
| 3,665,392 A | 5/1972 | Annas |
| 3,840,851 A | 10/1974 | Fowler et al. |
| 4,005,928 A | 2/1977 | Kmetz et al. |
| 4,023,029 A | 5/1977 | Fischer |
| 4,040,726 A | 8/1977 | Paca |
| 4,066,332 A | 1/1978 | Kato et al. |
| 4,158,483 A | 6/1979 | Fisher et al. |
| 4,274,078 A | 6/1981 | Isobe et al. |
| 4,299,444 A | 11/1981 | Romer |
| 4,443,057 A | 4/1984 | Bauer et al. |
| 4,463,411 A | 7/1984 | Proctor |
| 4,467,193 A | 8/1984 | Carroll |
| 4,475,100 A | 10/1984 | Duh |
| 4,479,172 A | 10/1984 | Connor |
| 4,491,390 A | 1/1985 | Tong-Shen |
| 4,499,451 A | 2/1985 | Suzuki et al. |
| 4,506,315 A | 3/1985 | Maekawa et al. |
| 4,516,197 A | 5/1985 | Yonkers |
| 4,583,155 A | 4/1986 | Hart |
| 4,588,267 A | 5/1986 | Pastore |
| 4,591,954 A | 5/1986 | Kawamura et al. |

(Continued)

*Primary Examiner*—Stephen Husar
*Assistant Examiner*—Meghan K. Dunwiddie
(74) *Attorney, Agent, or Firm*—Wells St. John P.S.

(57) ABSTRACT

An electromagnetic radiation assembly is described and which includes, a supporting substrate having a region through which visibly discernable electromagnetic radiation forming a signal may pass; first and second electromagnetic radiation emitters are provided and which are positioned adjacent to one of the surfaces defined by the substrate, and which, when energized, emit electromagnetic radiation; and a single reflector is disposed in eccentric reflecting relation relative to the first and second electromagnetic radiation emitters, and wherein emitted electromagnetic radiation is reflected by the single reflector and passes through the supporting substrate region which passes electromagnetic radiation, in different directions.

31 Claims, 8 Drawing Sheets

U.S. PATENT DOCUMENTS

| | | |
|---|---|---|
| 4,603,946 A | 8/1986 | Kato et al. |
| 4,613,791 A | 9/1986 | Kurihara et al. |
| 4,623,222 A | 11/1986 | Itoh et al. |
| 4,626,967 A | 12/1986 | Segoshi |
| 4,630,904 A | 12/1986 | Pastore |
| 4,646,210 A | 2/1987 | Skogler et al. |
| 4,659,967 A | 4/1987 | Dahl |
| 4,665,321 A | 5/1987 | Chang et al. |
| 4,701,022 A | 10/1987 | Jacob |
| 4,721,364 A | 1/1988 | Itoh et al. |
| 4,733,335 A | 3/1988 | Serizawa et al. |
| 4,733,336 A | 3/1988 | Skogler et al. |
| 4,741,603 A | 5/1988 | Miyagi et al. |
| 4,791,534 A | 12/1988 | Lindberg |
| 4,793,690 A | 12/1988 | Gahan et al. |
| 4,799,768 A | 1/1989 | Gahan |
| 4,807,096 A | 2/1989 | Skogler et al. |
| 4,841,198 A | 6/1989 | Wilhelm |
| 4,862,330 A | 8/1989 | Machida et al. |
| 4,868,459 A | 9/1989 | Dennerlein et al. |
| 4,868,719 A | 9/1989 | Kouchi et al. |
| 4,882,565 A | 11/1989 | Gallmeyer |
| 4,886,960 A | 12/1989 | Molyneux et al. |
| 4,893,063 A | 1/1990 | Pernyeszi |
| 4,902,108 A | 2/1990 | Byker |
| 4,916,430 A | 4/1990 | Vu et al. |
| 4,917,477 A | 4/1990 | Bechtel et al. |
| 4,929,866 A | 5/1990 | Murata et al. |
| 4,935,665 A | 6/1990 | Murata |
| 4,951,179 A | 8/1990 | Machida |
| 5,014,167 A | 5/1991 | Roberts |
| 5,029,060 A | 7/1991 | Aho et al. |
| 5,050,051 A | 9/1991 | Machida et al. |
| 5,059,015 A | 10/1991 | Tran |
| 5,066,112 A | 11/1991 | Lynam et al. |
| 5,069,535 A | 12/1991 | Baucke et al. |
| 5,072,340 A | 12/1991 | Jones |
| 5,076,673 A | 12/1991 | Lynam et al. |
| 5,093,768 A | 3/1992 | Ohe |
| 5,097,395 A | 3/1992 | Aho et al. |
| 5,115,346 A | 5/1992 | Lynam |
| 5,136,419 A | 8/1992 | Shabrang |
| 5,150,966 A | 9/1992 | Nelson |
| 5,165,772 A | 11/1992 | Wu |
| 5,174,649 A | 12/1992 | Alston |
| 5,189,537 A | 2/1993 | O'Farrell |
| 5,207,492 A | 5/1993 | Roberts |
| 5,211,466 A | 5/1993 | Jarocki et al. |
| 5,241,457 A | 8/1993 | Sasajima et al. |
| 5,253,109 A | 10/1993 | O'Farrell |
| 5,272,602 A | 12/1993 | Sasajima et al. |
| 5,285,060 A | 2/1994 | Larson et al. |
| 5,303,130 A | 4/1994 | Wei et al. |
| 5,313,335 A | 5/1994 | Gray et al. |
| 5,336,448 A | 8/1994 | Byker |
| 5,355,284 A | 10/1994 | Roberts |
| 5,361,190 A | 11/1994 | Roberts et al. |
| 5,371,659 A | 12/1994 | Pastrick et al. |
| 5,388,035 A | 2/1995 | Bodem, Jr. |
| 5,402,103 A | 3/1995 | Tashiro |
| 5,404,869 A | 4/1995 | Parkyn, Jr. et al. |
| 5,416,313 A | 5/1995 | Larson et al. |
| 5,436,741 A | 7/1995 | Crandall |
| 5,436,809 A | 7/1995 | Brassier et al. |
| 5,438,487 A | 8/1995 | Schmid et al. |
| D363,920 S | 11/1995 | Roberts et al. |
| 5,481,409 A | 1/1996 | Roberts |
| 5,497,305 A | 3/1996 | Pastrick et al. |
| 5,497,306 A | 3/1996 | Pastrick |
| 5,504,478 A | 4/1996 | Knapp |
| 5,528,422 A | 6/1996 | Roberts |
| 5,530,240 A | 6/1996 | Larson et al. |
| 5,575,552 A | 11/1996 | Faloon |
| 5,587,699 A | 12/1996 | Faloon et al. |
| 5,619,374 A | 4/1997 | Roberts |
| 5,619,375 A | 4/1997 | Roberts |
| 5,660,457 A | 8/1997 | Lyons |
| 5,668,663 A | 9/1997 | Varaprasad et al. |
| 5,669,704 A | 9/1997 | Pastrick |
| 5,669,705 A | 9/1997 | Pastrick et al. |
| 5,724,187 A | 3/1998 | Varaprasad et al. |
| D394,833 S | 6/1998 | Muth |
| 5,760,962 A | 6/1998 | Schofield et al. |
| 5,788,357 A | 8/1998 | Muth et al. |
| 5,818,625 A | 10/1998 | Forgette et al. |
| 5,825,527 A | 10/1998 | Forgette et al. |
| 5,863,116 A | 1/1999 | Pastrick et al. |
| 5,879,074 A | 3/1999 | Pastrick |
| 5,889,608 A | 3/1999 | Buffat et al. |
| D409,540 S | 5/1999 | Muth |
| 5,938,320 A | 8/1999 | Crandall |
| 5,959,367 A | 9/1999 | O'Farrell et al. |
| 6,005,724 A | 12/1999 | Todd |
| 6,007,222 A | 12/1999 | Thau |
| 6,045,243 A | 4/2000 | Muth et al. |
| D425,466 S | 5/2000 | Todd et al. |
| D426,506 S | 6/2000 | Todd et al. |
| D426,507 S | 6/2000 | Todd et al. |
| D427,128 S | 6/2000 | Mathieu |
| 6,076,948 A | 6/2000 | Bukosky et al. |
| D428,372 S | 7/2000 | Todd et al. |
| D428,373 S | 7/2000 | Todd et al. |
| 6,086,229 A | 7/2000 | Pastrick |
| 6,093,976 A | 7/2000 | Kramer et al. |
| D428,842 S | 8/2000 | Todd et al. |
| D429,202 S | 8/2000 | Todd et al. |
| D430,088 S | 8/2000 | Todd et al. |
| 6,111,684 A | 8/2000 | Forgette et al. |
| 6,142,656 A | 11/2000 | Kurth |
| 6,163,083 A | 12/2000 | Kramer et al. |
| 6,166,848 A | 12/2000 | Cammenga et al. |
| 6,175,164 B1 | 1/2001 | O'Farrell et al. |
| 6,176,602 B1 | 1/2001 | Pastrick et al. |
| 6,257,746 B1 * | 7/2001 | Todd et al. ................ 362/494 |
| 6,356,376 B1 | 3/2002 | Tonar et al. |
| 6,441,943 B1 | 8/2002 | Roberts et al. |
| 6,512,624 B1 | 1/2003 | Tonar et al. |
| 6,650,457 B1 | 11/2003 | Busscher et al. |
| 6,657,767 B1 | 12/2003 | Bonardi |
| 2004/0114384 A1 | 6/2004 | Carter et al. |

\* cited by examiner

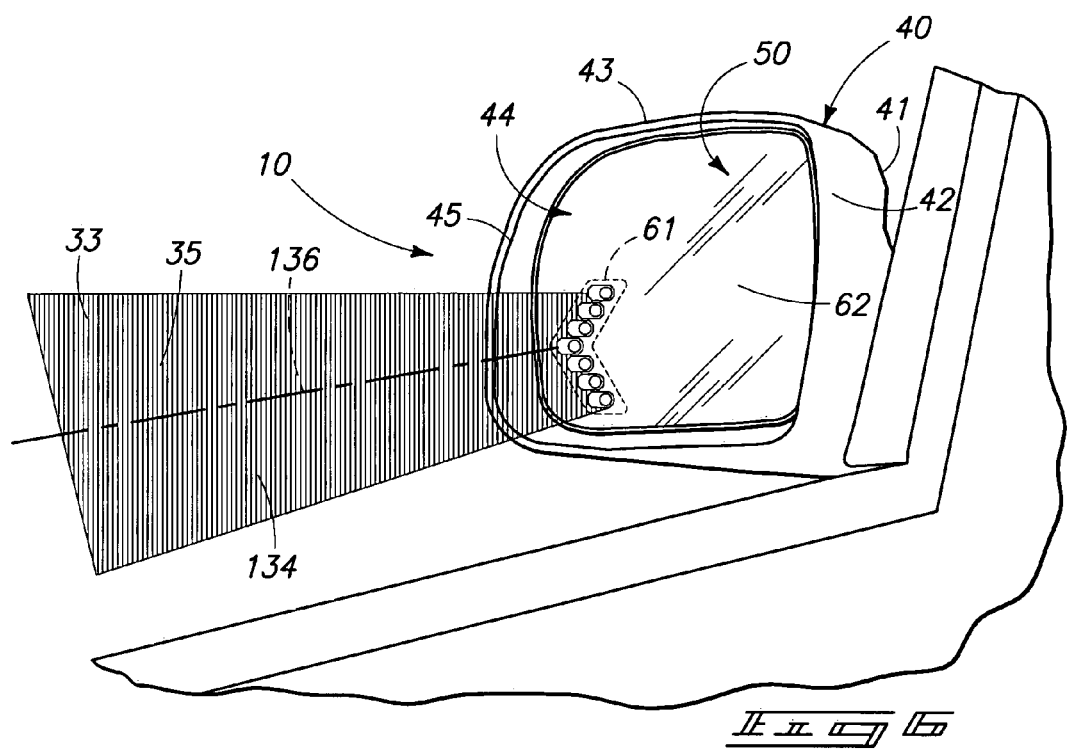
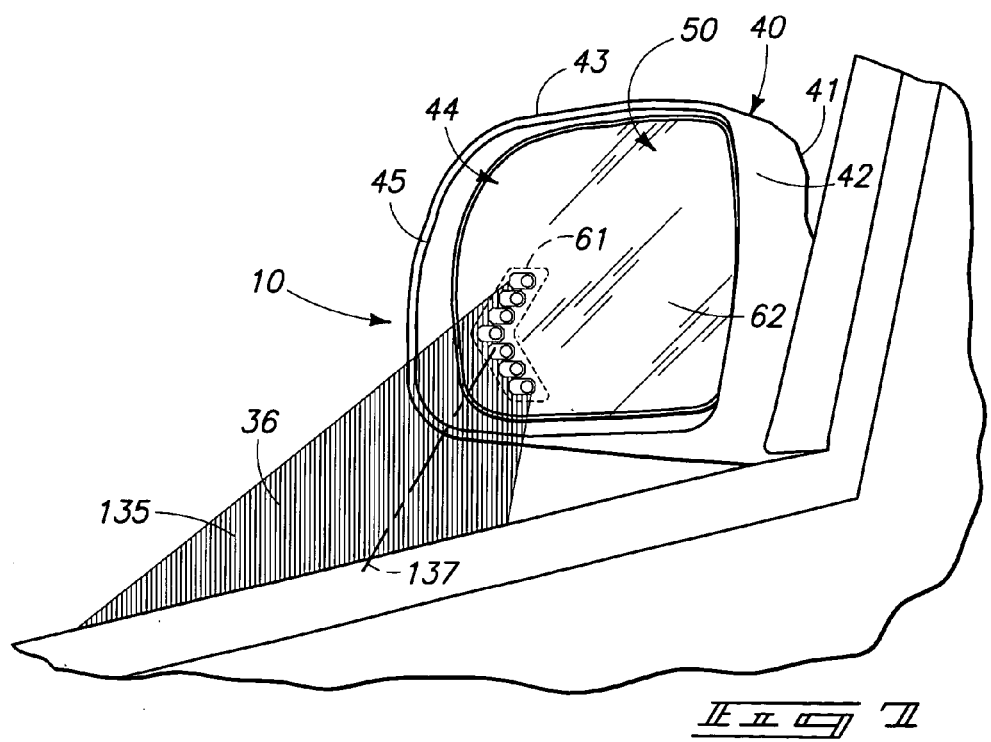

ELECTROMAGNETIC RADIATION ASSEMBLY

TECHNICAL FIELD

The present invention relates to an electromagnetic radiation assembly, and more specifically, to an assembly having particular utility when coupled with the controls of an overland vehicle, or the like, and which, on the one hand, may operate as a combined warning lamp, and rearview mirror assembly, and further is operable to illuminate the side, and region adjacent to the overland vehicle to assist an operator or passenger when they are entering, or departing from the vehicle during reduced periods of visibility.

BACKGROUND OF THE INVENTION

The beneficial effects of employing auxiliary signaling assemblies have been disclosed in various U.S. Patents including U.S. Pat. Nos. 6,005,724 and 6,076,948, the teachings of which are incorporated herein. Yet further, numerous designs of signaling assemblies, having various semitransparent mirrors including dichroic, and electrochromic type mirrors are disclosed in U.S. Pat. Nos. 5,014,167; 5,207,492; 5,355,284; 5,361,190; 5,481,409 and 5,528,422. These references are also incorporated by reference herein. Assemblies such as what is shown in U.S. Pat. Nos. 6,005,724 and 6,076,948 have been incorporated into other mirror assemblies such as electrochromic mirror assemblies as more fully shown in U.S. Pat. Nos. 6,512,624, and 6,356,376, the teachings of which are also incorporated by reference herein. In addition to providing an auxiliary signaling device, such prior art assemblies have also included auxiliary lighting which has typically been remotely actuated in order to provide an exterior vehicle security light to aid and assist operators and passengers during night time hours. Examples of such assemblies are shown in U.S. Pat. Nos. 5,371,659 and 5,497,305 to name but a few.

While these prior art assemblies, as discussed above, have operated with a great deal of success, and have enjoyed wide commercial acceptance, there are shortcomings with respect to the individual designs which have detracted from their usefulness. For example, with respect to U.S. Pat. Nos. 5,371,659 and 5,497,305 these particular assemblies, while effective for their intended purposes, are complex in their overall designs. This, of course, increases the cost of the resulting exterior mirror which incorporates same. As will be readily recognized from the study of the drawings of these respective prior art patents, the exterior mirror housing that must be utilized for this type of arrangement must be larger than what it would normally be merely because it needs to accommodate the assembly which projects visible light into the region adjacent to the overland vehicle. Still further, separate electrical connections must be made to the portion of the assembly which projects light into this region, thereby adding complexity to the wire harness that must be provided to service such a mirror, especially if this mirror incorporates an electrochromic type mirror which must also be provided with a source of electrical power in order to operate. These somewhat larger exterior mirror housings, of course, detract from the aesthetic appearance of the overland vehicle which is equipped with same and may not be useful on smaller or more compact vehicle platforms.

In the present invention, the inventors have departed from the teachings of the prior art by providing a novel arrangement which, in a first mode of operation, permits the electromagnetic radiation assembly to operate as an exterior warning lamp that can alert operators of vehicles traveling in adjacent lanes; and which further, in a second mode of operation, will emit visible light which is operable to illuminate the adjacent area and region along the side of the vehicle to assist an operator or passenger who is either entering or exiting the vehicle or working along same during periods of reduced visibility.

These and other aspects of the present invention will be discussed in greater detail hereinafter.

SUMMARY OF THE INVENTION

Therefore, one aspect of the present invention relates to an electromagnetic radiation assembly which includes a supporting substrate having opposite surfaces, and having a region through which an electromagnetic radiation signal may pass; first and second electromagnetic radiation emitters positioned adjacent to one of the surfaces defined by the substrate, and which, when energized, emit electromagnetic radiation; and a single reflector disposed in eccentric reflecting relation relative to the first and second electromagnetic radiation emitters, and wherein the emitted electromagnetic radiation produced by the first and second electromagnetic radiation emitters is reflected by the single reflector and passes through the supporting substrate region which passes electromagnetic radiation in different directions.

Another aspect of the present invention relates to an electromagnetic radiation assembly which includes a supporting substrate having opposite first and second surfaces, and having a first region which allows electromagnetic radiation to pass therethrough, and a second region adjacent to the first region; a reflector positioned adjacent to the second surface of the supporting substrate and oriented in a position which is adjacent to the first region; and at least two electromagnetic radiation emitters mounted on, or adjacent to the second surface of the supporting substrate, and which, when individually energized, emit electromagnetic radiation which is reflected by the reflector through the first region of the supporting substrate, and wherein the energizing of one of the electromagnetic radiation emitters produces visibly discernible electromagnetic radiation which is reflected, at least in part, by the reflector, and which passes through the first region and predominately in a first direction, and wherein energizing of the other of the two electromagnetic radiation emitters emits visibly discernible electromagnetic radiation which is reflected, at least in part, by the reflector, and which passes through the first region and predominately in a second direction which is angularly displaced relative to the first direction.

Still another aspect of the present invention relates to an electromagnetic radiation assembly which includes, a supporting substrate having opposite surfaces, and having a region through which an electromagnetic radiation signal may pass; a plurality of first and second electromagnetic radiation emitters positioned adjacent to one of the surfaces defined by the supporting substrate, and which, when energized, emit visibly discernable electromagnetic radiation; and a multi-faceted reflector disposed in covering, eccentric reflecting relation relative to the plurality of first and second electromagnetic radiation emitters, and wherein the emitted electromagnetic radiation produced by the first electromagnetic radiation emitters is substantially reflected through the substrate region in a first direction by a first group of reflector facets, and the emitted electromagnetic radiation produced by the second electromagnetic radiation emitters is substantially reflected by a second group of reflector facets through the substrate region in a second direction.

These and other aspects of the present invention will be discussed in greater detail hereinafter.

BRIEF DESCRIPTION OF THE DRAWINGS

Preferred embodiments of the invention are described below with reference to the following accompanying drawings.

FIG. 6 is a simplified, perspective, side elevation view of the electromagnetic radiation assembly of the present invention, and which shows the approximate projected pattern of light provided by the invention when operating in a first mode.

FIG. 7 is a simplified, perspective, side elevation view of the electromagnetic radiation assembly of the present invention, and which shows the approximate projected pattern of light provided by the invention when operating in a second mode.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
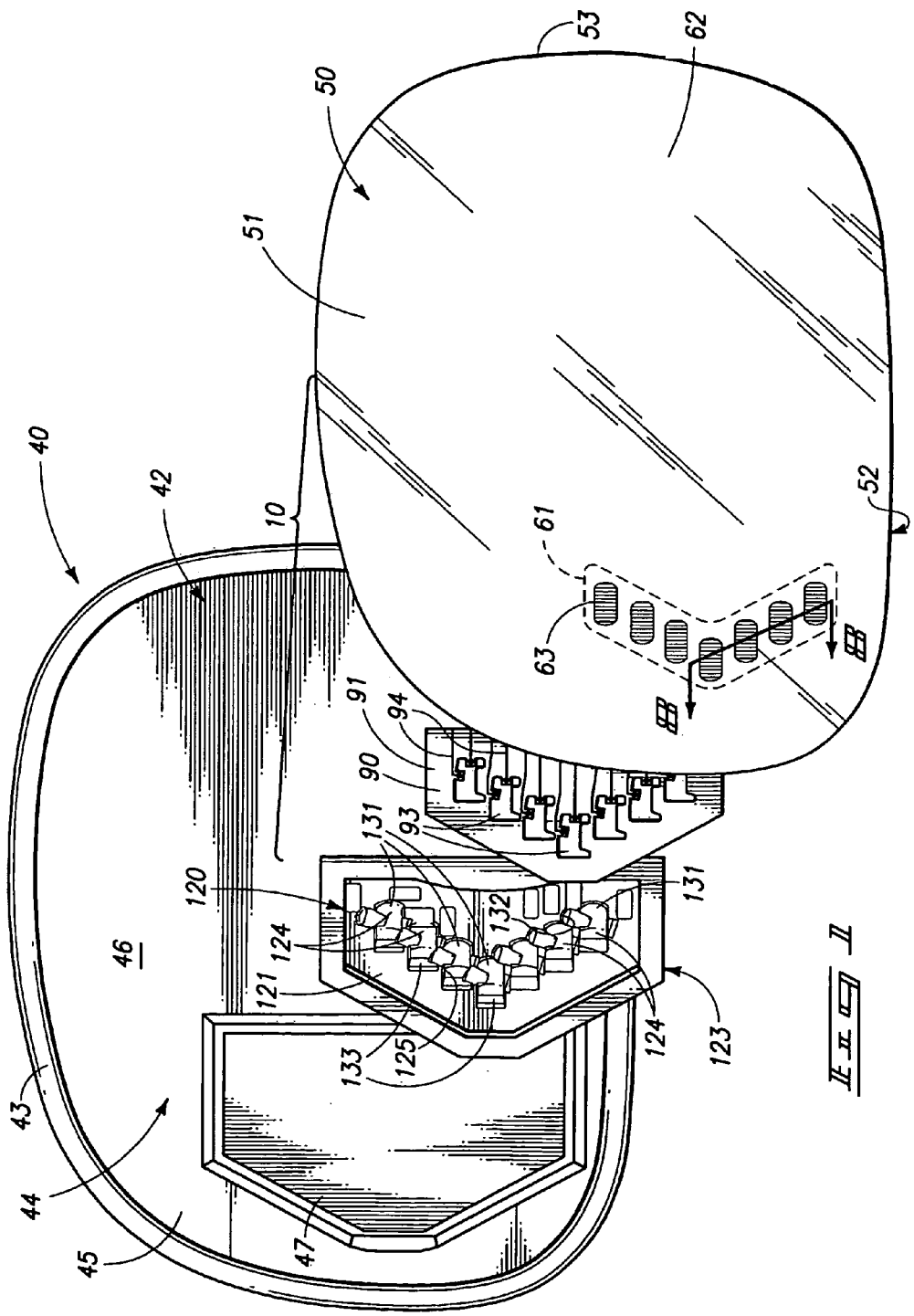
FIG. 1 is a greatly simplified, perspective, exploded view of the electromagnetic radiation assembly of the present invention.

Referring more particularly to the drawings, the electromagnetic radiation assembly of the present invention is generally indicated by the numeral 10, in FIG. 1, and following. For illustrative convenience the electromagnetic radiation assembly 10 of the present invention, and which is shown and described herein, is discussed as it would be configured if it was installed on an overland vehicle 11 of conventional design. As discussed in many of the earlier prior art references, which are incorporated by reference herein, the electromagnetic radiation assembly (hereinafter referred to as assembly 10) of the present invention is adapted to operate as a combination rearview mirror and visual signaling device, and wherein the visual signaling device provides a visual signal which is capable of being seen from locations which are laterally and rearwardly of the overland vehicle 11, when the invention is operating in a first mode. During this first mode of operation the visual signal, at a significantly reduced intensity, can normally be seen by the operator of the same vehicle. Still further, the invention, when operating in a second mode, is operable to illuminate the side, and region adjacent to the overland vehicle, in order to assist an operator or passenger when they are entering or exiting the vehicle during reduced periods of visibility. These first and second modes of operation will be discussed in greater detail hereinafter.

Figure 4:
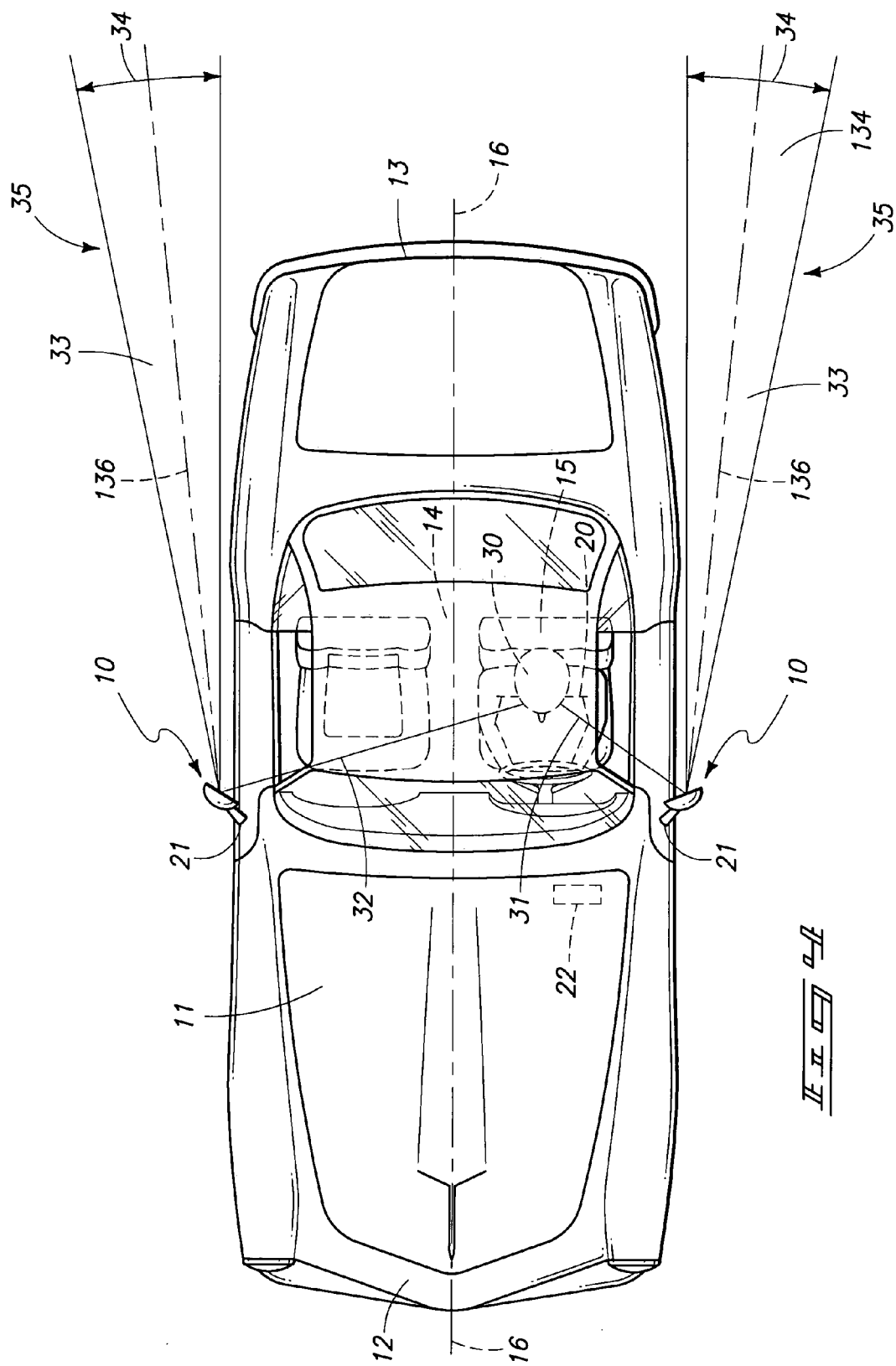
FIG. 4 is a top, plan view of an overland vehicle of conventional design, and which illustrates the approximate projected pattern of light as provided by the electromagnetic radiation assembly of the present invention while operating in a first mode.
Figure 5:
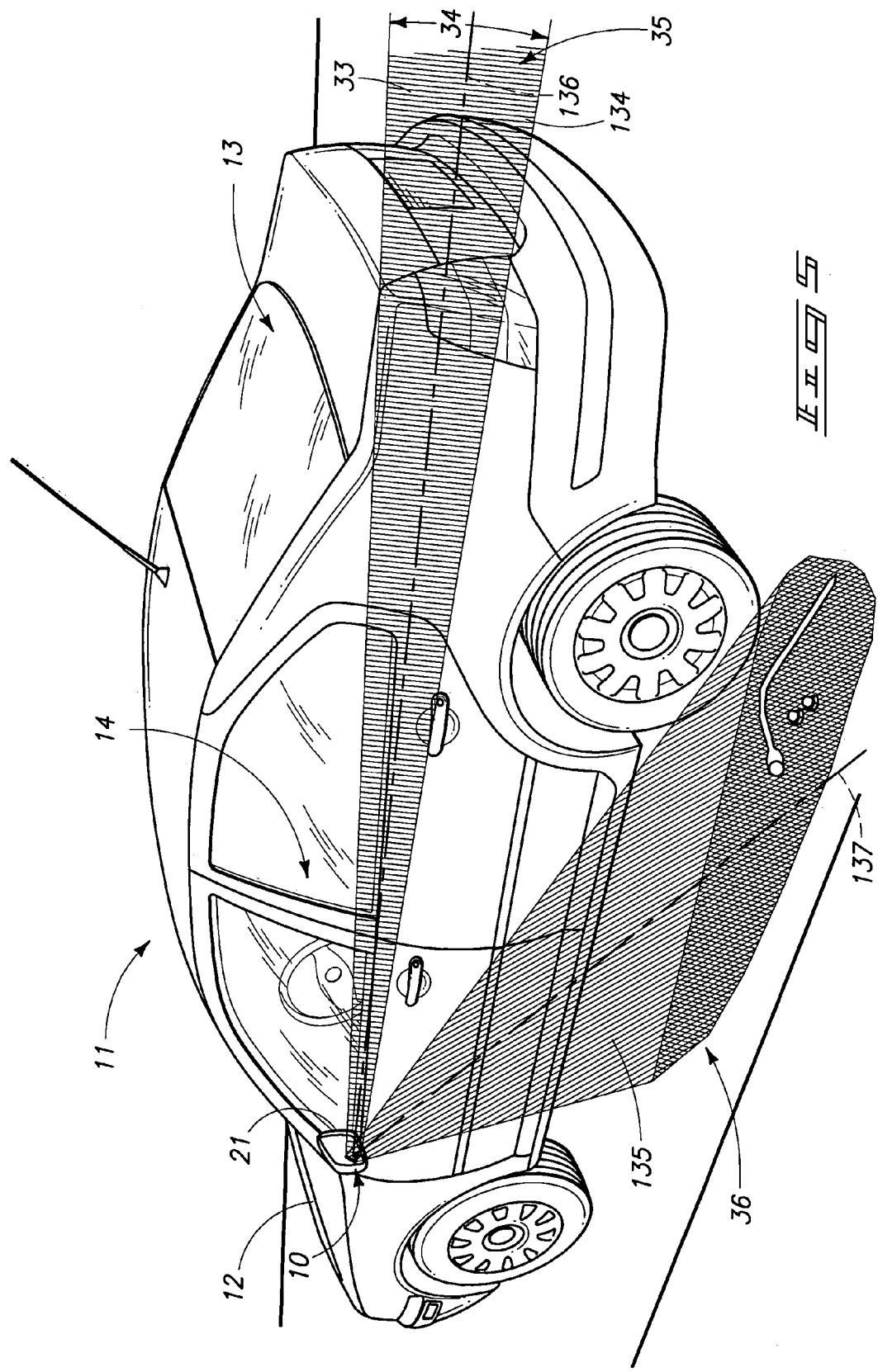
FIG. 5 is a perspective, side elevation view of an overland vehicle of conventional design, and which illustrates the approximate projected pattern of light as provided by the electromagnetic radiation assembly of the present invention while operating in a first, and in a second mode.

As best seen in FIGS. 4 and 5, the assembly 10 of the present invention is mounted on an overland vehicle 11 of conventional design. The overland vehicle 11 has a front or forward portion 12, and a rearward portion 13. The overland vehicle 11 further has a passenger compartment 14 which includes a front seat 15. Still further, the overland vehicle 11 has a longitudinal axis which is generally indicated by the numeral 16, and an operator's position 20. The overland vehicle also includes locations 21 for a pair of exterior rearview mirrors. The overland vehicle 11 also has a hand operated directional signaling switch; and brake (not shown), and which when utilized, provides an electrical signal which may alert drivers of other vehicles in the immediate vicinity that the overland vehicle 11 is about to change directions, turn, change lanes, etc. Yet further, other signals may also be provided from the overland vehicle from other devices such as a hazard warning switch. In addition to the foregoing, the overland vehicle 11 may be equipped with a radio frequency receiver 22 and which receives an RF signal which is transmitted from a key fob held by the operator of the overland vehicle (not shown). This radio signal, once received, is operable to unlock the various doors of the overland vehicle, and further, is useful in actuating the second mode of operation of the electromagnetic radiation assembly 10, as will be discussed below.

As best illustrated in FIG. 4, an operator 30, when positioned in the operator's position 20, has a field of view which extends approximately 180 degrees from the operator's position towards the forward portion 12 of the vehicle. Further, and by using a pair of the assemblies 10, which are individually located at the positions 21 on the exterior portion of the overland vehicle 11, the operator may, by looking along predetermined lines of sight, view areas beyond his normal field of view, and rearwardly of the operator's position 20. In particular, the operator 30 has a first line of sight 31, which extends from the operator 30 to the assembly 10, which is located on the driver's side of the overland vehicle 11, and which permits the operator to view rearwardly of the vehicle along the driver's side thereof. The operator 30 additionally has a second line of sight 32 which extends from the operator 30 to the passenger side of the overland vehicle and therefore permits the operator to view rearwardly along that side of the overland vehicle. Furthermore, the operator has a third line of sight which extends from the operator's position to the interior rearview mirror (not shown). As depicted in the drawings, the assembly 10 of the present invention, in a first mode of operation, provides illumination zones 33 which extend rearwardly of the overland vehicle 11 and predominately out of the line of sight of the operator 30. These illumination zones have a predetermined beam spread 34 of approximately six meters when measured at a distance of about 8 meters from the assembly 10. Further, the deviation angle of the driver's side and passenger's side illumination zone may be varied based upon the geometry of the overland vehicle 11 upon which the assembly 10 is utilized. In a first mode of operation 35, and when energized, the assembly 10 is operable to produce visibly discernible electromagnetic radiation which is provided to the illumination zones 33 in order to signal adjacent vehicles or other interested parties regarding the actions of the operator of the overland vehicle 11. Further in a second mode of operation 36 (FIG. 5), the assembly 10, when energized, is operable to produce visibly discernable light which illuminates the side, and region adjacent the overland vehicle to aide, and assist an operator or passenger who may be entering, exiting, or working along the side of the overland vehicle 11.

Referring now to FIG. 1, the assembly 10 of the present invention is incorporated into a mirror housing which is generally indicated by the numeral 40, and which is operable to be mounted at mirror locations 21 on the exterior surface of the overland vehicle 11. The mirror housing or enclosure has a rear wall 41 (FIG. 6), and a sidewall 42 which extends outwardly therefrom. The sidewall 42 has a peripheral edge 43 which defines an aperture 44 having given dimensions. The rear wall 41, and sidewall 42 further defines a cavity 45 which is operable to receive and enclose the assembly 10 and other associated devices such as a bezel 46. It should be understood that the bezel may provide a cavity 47 which receives the assembly 10, and which further will movably support the assembly 10 within the housing 40. The assembly 10 can then be positionally adjusted, either manually, or remotely, as by a motorized actuator (not shown) to a given angular orientation relative to the first and second lines of sight 31 and 32 of the operator 30 of the overland vehicle 11. This provides a means by which the operator 30 may adjust his given field of view rearwardly of the overland vehicle 11.

Figure 8:
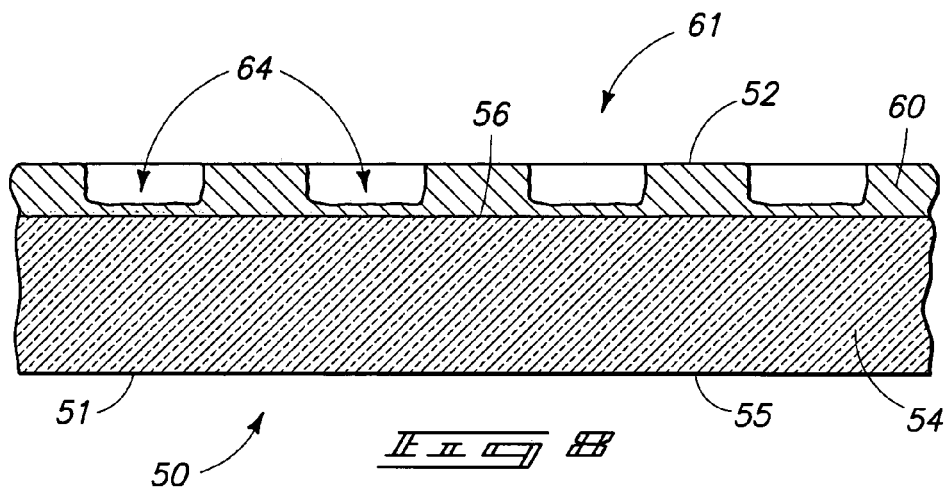
FIG. 8 is a greatly exaggerated, partial, vertical sectional view of the electromagnetic radiation assembly, and which is taken from a position along line 8—8 in FIG. 1.
Figure 9:
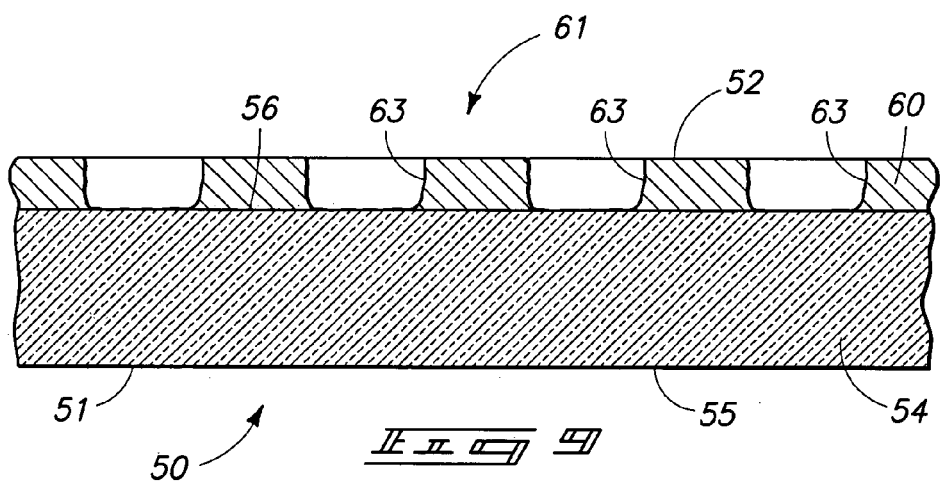
FIG. 9 is a greatly enlarged, partial, vertical, sectional view of the electromagnetic radiation assembly and which is taken from a position along line 8—8 of FIG. 1, and which illustrates an alternative form of the invention from that shown in FIG. 8.

The assembly 10 of the present invention as shown in FIG. 1, and following, includes a semitransparent mirror which is generally indicated by the numeral 50, and which has a front or exterior facing surface 51, and an opposite, or rearward facing surface 52. The semitransparent mirror further is defined by a peripheral edge 53, which substantially corresponds in shape and size to the aperture 44 which is defined by the peripheral edge 43 of the housing 40. When assembled, the semitransparent mirror 50 substantially occludes the aperture 44. The semitransparent mirror 50 of the subject invention 10 may take on several forms. Referring now to FIGS. 8 and 9, the semitransparent mirror 50 comprises, in a first form, a supporting, substantially transparent or translucent substrate 54, which has a forward facing surface 55, and an opposite rearward facing surface 56. A highly reflective mirror coating 60 is formed on the rearward facing surface 56. As should be understood, the mirror coating may be applied, in an alternative form, to the forward facing surface of the substrate 54. The discussion which follows, therefore, is applicable to mirrors where the mirror coating is applied to either the forward or rearward facing surfaces thereof. The highly reflective mirror coating 60 may comprise any number of different highly reflective, or mirror like coatings, or substances, such as chromium and the like, and which may be applied or formed in a manner which provides a commercially acceptable reflective surface. For automotive applications, the resulting reflectance of the semitransparent mirror 50 should generally be, on average, greater than about 35%.

As best seen by reference to FIG. 1, the semitransparent mirror 50 has a first or primary region 61 and through which a visibly discernable electromagnetic radiation signal may pass; and an adjacent secondary region 62. While only two regions are shown and discussed herein, it is, of course, possible to have a plurality of secondary regions depending upon the end use of the assembly 10. As a general matter however, the first or primary region 61 passes a portion of the visibly discernible electromagnetic radiation directed at same, while simultaneously reflecting a given percentage of the visibly discernible electromagnetic radiation which comes from the ambient environment. On the other hand, the secondary region is operable to reflect visibly discernible electromagnetic radiation, and is otherwise considered nominally opaque. As discussed above, the combined average reflectance of the overall surface area of the semitransparent mirror 50, including both the primary and secondary regions, is normally greater than about 35% when employed for automotive applications. In other industrial applications, the average reflectance may be lower or higher depending upon the desired end use. As seen in the drawings, the secondary region 62 is substantially continuous and reflects, for automotive applications, greater than about 35% of visible electromagnetic radiation and passes less than about 10% of visibly discernable electromagnetic radiation. The first or primary region 61, on the other hand, passes less than about 50% of visible electromagnetic radiation, and further reflects on average less than about 40% of visible electromagnetic radiation. The ranges noted above have been found suitable for automotive applications, however, it will be recognized that other broadened, or narrowed ranges may be useful for other industrial applications.

As best seen in FIG. 9, in a first form of the invention 10, the mirror coating 60 in the first or primary region 61, of the semitransparent mirror 50 includes a plurality of discreet apertures 63, and which may be formed in a number of given patterns, and in various densities. As recognized by a study of FIG. 9, which is greatly exaggerated, the plurality of discreet apertures extend, in this form of the invention 10, through the mirror coating 60 to the rearward surface 56 of the transparent substrate 54. In an alternative form of the invention, as shown in FIG. 8, reduced thickness areas 64 may be formed in the mirror coating 60. These reduced thickness areas allow increased amounts of visibly discernable electromagnetic radiation to pass therethrough in relative comparison to the adjacent thicker areas in the secondary region 62. Therefore, the secondary region 62 has a first thickness dimension for the mirror coating 60 which is greater than the thickness dimension of the mirror coating 60 which defines the first or primary region 61. Still further, these two approaches may be combined, and wherein the apertures 63 be joined with a reduced thickness area 64.

Figure 10:
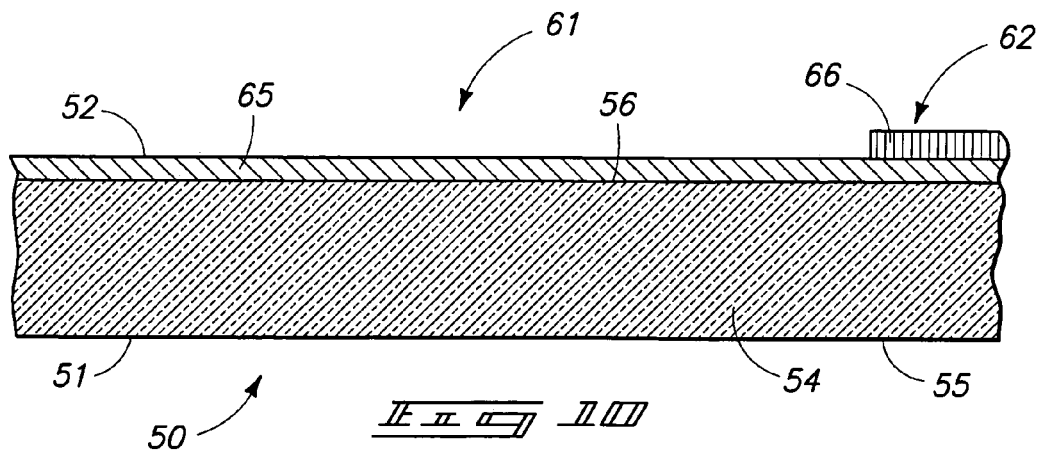
FIG. 10 is a greatly enlarged, partial, vertical, sectional view of the electromagnetic radiation assembly, and which illustrates yet another form of the invention.

Referring now to FIG. 10, another form of a semitransparent mirror 50 is shown, and which is useful in the present invention 10. In this form of the invention, the substrate 54 has applied thereto a dichroic mirror coating 65. The usefulness of dichroic mirrors, of various types, have been discussed in various U.S. Patents including U.S. Pat. Nos. 5,014,167 and 5,207,492 to name but a few. The dichroic mirror coatings 65 which are useful for such mirrors are also well known in the art, and further discussion regarding these dichroic mirror coatings is not warranted. As seen in FIG. 10, a substantially opaque masking layer 66 is applied over the secondary region 62 thereby making the secondary region substantially opaque, and further permitting visible electromagnetic radiation to be passed through the first or primary region 61 which is unmasked. As discussed in the earlier prior art patents, the dichroic mirror coating 65 may be selected to pass given bands of visibly discernable electromagnetic radiation in greater amounts than other bands of electromagnetic radiation thereby making the resulting semitransparent mirror 50, on average, an acceptable reflector of visibly discernable electromagnetic radiation, while simultaneously allowing increased amounts electromagnetic radiation of the selected band of electromagnetic radiation to pass therethrough.

Figure 11:
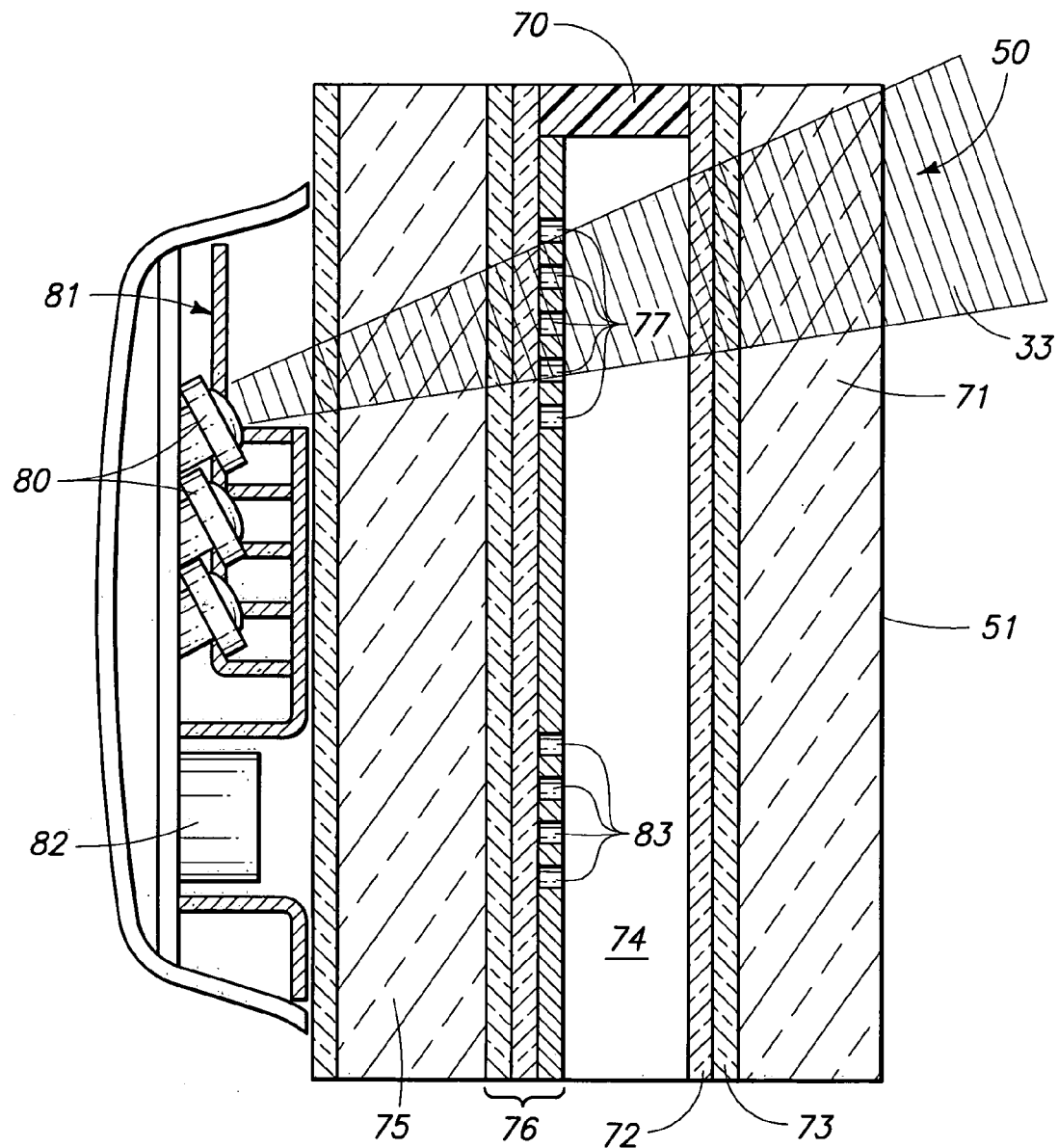
FIG. 11 is a partial, transverse, vertical, sectional view of yet another form of the invention.

Yet a further form of an acceptable semitransparent mirror 50 which may be employed in the present invention 10 is seen in FIG. 11, and which illustrates a prior art arrangement for a signaling assembly which incorporates an electrochromic mirror which is generally indicated by the numeral 70. The electrochromic mirror 70 includes a front or transparent element or substrate 71, and further has applied to its rearwardly facing surface, a transparent electrically conductive material 72, and a layer of color suppression material which is generally indicated by the numeral 73. In the arrangement as shown in FIG. 11, an electrochromic fluid or gel 74 is provided, and which is sandwiched between the front element 71 and a rear element 75 which is also transparent. As seen in FIG. 11, a conductive thin film reflector/electrode 76 is positioned in spaced relation relative to the front element 71. Still further, a plurality of apertures 77 are formed in this conductive thin film reflector/electrode 76 and which will permit the passage of visibly discernible electromagnetic radiation to pass therethrough forming the illumination zone 33. As seen in FIG. 11, a light source 80 is provided, and which is disposed at an oblique orientation relative to the electrochromic mirror 70. Still further, a light baffle assembly 81 is provided and which is substantially identical to that described in our previous U.S. Pat. No. 6,257,746. The teachings of which are incorporated by reference herein. The light baffle assembly is operable to allow the passage of visibly discernable electromagnetic radiation to strike the electrochromic mirror 70 in a given orientation such that it can be transmitted into the illumination zone 33. A light sensor 82 is provided and which is oriented in a fashion so as to receive ambient electromagnetic radiation passing through apertures 83 which are formed in the thin film reflector/electrode 76 thereby allowing for the automatic adjustment of the reflectance of the electrochromic mirror 70. This prior art arrangement is discussed in further detail in U.S. Pat. No. 6,512,624, the teachings of which are incorporated by reference herein. As will be appreciated by a study of the drawings, the electrochromic mirror 70, as shown herein, may be useful in the practice of the present invention 10, as will be discussed in greater detail below.

Figure 2:
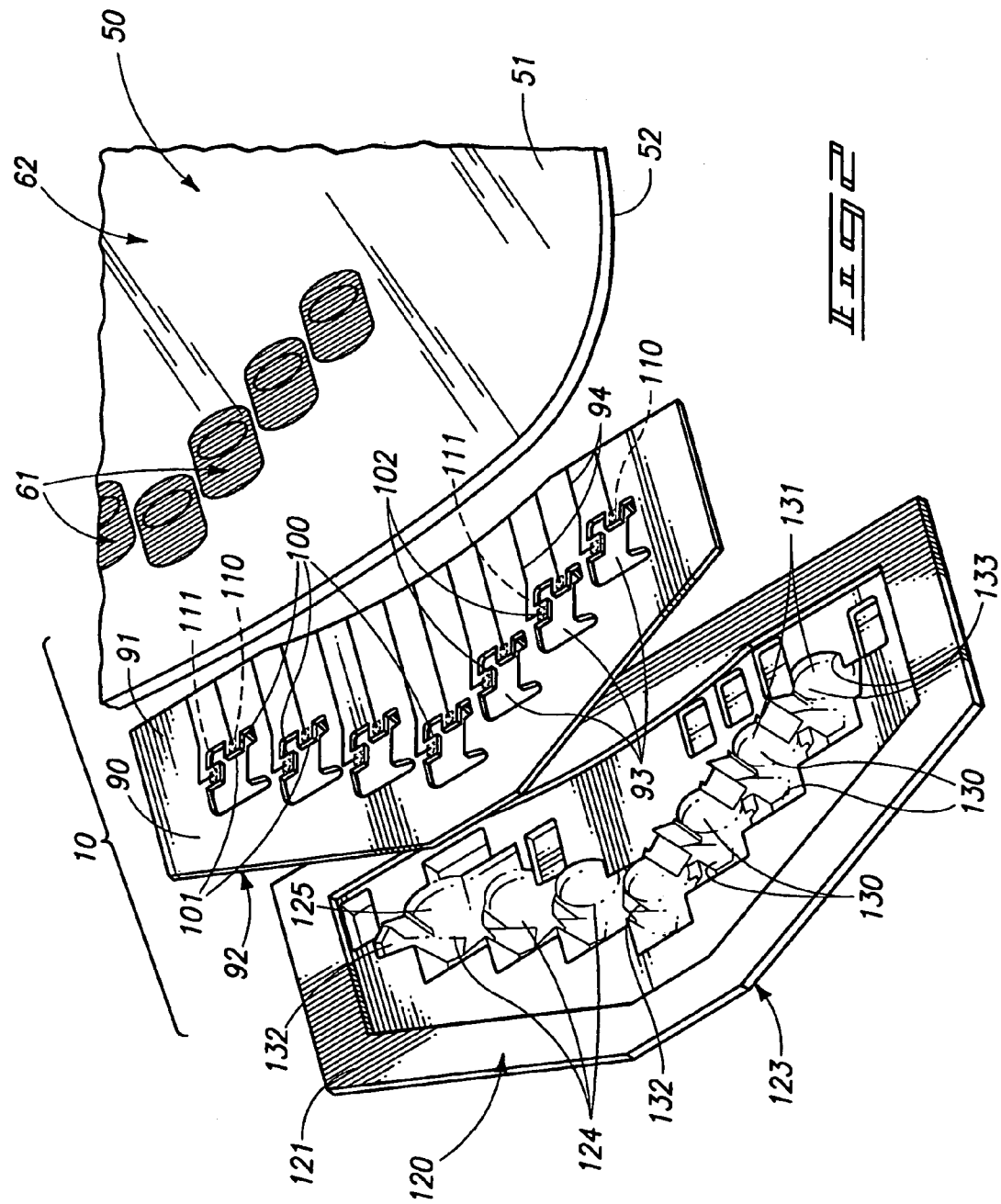
FIG. 2 is a fragmentary, greatly enlarged, perspective view of the electromagnetic radiation assembly of the present invention.

Referring now to FIGS. 1 and 2, the assembly 10 of the present invention includes first and second electromagnetic radiation emitters, as will be discussed hereinafter, and which are individually positioned adjacent to one of the surfaces 51 or 52 of the supporting substrate 54 and which, when energized, emit visibly discernable electromagnetic radiation and which is projected in given patterns and orientations during the first and second mode of operation 35 and 36, respectively. In this regard, and as best seen in FIGS. 1 and 2, a second substrate, and which is generally indicated by the numeral 90, is positioned in juxtaposed relation relative to the rearward facing surface 52 of the semitransparent mirror 50. The second substrate 90 has a first surface 91, which is positioned adjacent to the rearward facing surface 52 of the semitransparent mirror 50, and further has an opposite second surface 92. As seen in the exploded view of FIGS. 1 and 2, the second substrate, which may comprise a flexible electrically insulative circuit substrate, and which conforms to the shape of the semitransparent mirror 50, defines a plurality of apertures 93. The plurality of apertures permits the passage of visibly discernable electromagnetic radiation therethrough, and further when properly positioned relative to the semitransparent mirror 50 are substantially aligned with the first or primary region 61 which has been rendered operable to pass visibly discernable electromagnetic radiation. As best seen by reference FIGS. 1 and 2, the second substrate 90 supports a plurality of electrical pathways 94 which are formed thereon and which conduct electrical power to the distal or connector end thereof for energizing individual light emitting diodes as will be discussed below.

The second substrate 90 defines a plurality of electromagnetic radiation emitter, or light emitting diode supporting surfaces, which are generally indicated by the numeral 100. The respective supporting surfaces 100 include a first group of supporting surfaces 101, and a second group of supporting surfaces 102. Mounted on the second surface 92 of each of the first group of supporting surfaces 101, are individual electromagnetic radiation emitters herein illustrated as first light emitting diodes 110. Further, a second plurality of electromagnetic radiation emitters herein illustrated as light emitting diodes 111 are individually mounted on the second surface 92 of each of the second group of supporting surfaces 102. The respective electromagnetic radiation emitters or light emitting diodes 110 and 111 are each electrically coupled with the respective electrical pathways 94. As should be understood, when electrical power is provided to the respective electrical pathways 94, the respective light emitting diodes become energized, and emit visibly discernible electromagnetic radiation which is subsequently passed by the first region 61 of the semitransparent mirror 50 as will be discussed in greater detail hereinafter, and which is projected in the given patterns which are characteristic of the first and second modes of operation 35 and 36, respectively. As best appreciated by a study of FIGS. 1 and 2, the second substrate 90 which forms a flexible circuit substrate which is juxtaposed relative to the rearward facing surface 52 of the semitransparent mirror 50, may be formed of an opaque, or translucent electrically insulative substrate, depending upon the end use. Yet further, and while depicted in FIGS. 1 and 2 as being a discreet substrate 90 which mates in interfitted relation with an accompanying reflector, which will be discussed below, it will be recognized that the second substrate 90 may be incorporated or made integral with other subassemblies, such as a heater, which lies in juxtaposed heat transferring relation relative to the rearward facing surface 52 of the semitransparent mirror 50. Therefore, for purposes of the present application, it should be appreciated that the electrical pathways 94 may be incorporated into an associated heater element, or other electrical assemblies, which may be electrically energized from a common electrical source which is provided by the overland vehicle 11. Yet further, it should be appreciated that the second substrate 90 may be completely eliminated in some applications, and the plurality of electromagnetic radiation emitters or light emitting diodes 110 and 111 may be affixed directly to the rearwardly facing surface 52 of the semitransparent mirror 50. In this arrangement, the electrically conductive pathways 94 would be applied by a silkscreen, or similar application technique directly to the rearwardly facing surface 52 of the semitransparent mirror 50. Still further and as appreciated by a study of FIG. 3, an adhesive layer 112 may be provided and which affixes the second substrate 90 in an appropriate orientation relative to the first region 61 of the semitransparent mirror 50. This adhesive layer may further serve as a spacer in order to orient the flexible circuit substrate a predetermined distance from an underlying electrically conductive region of a heater (not shown). This arrangement simplifies the electrical coupling of the circuit substrate to electrical pathways made integral with the heater. Such electrical coupling may be made by traditional means such as soldering and the like.

Referring now to FIGS. 1 and 2, the assembly 10 of the present invention includes a multi-faceted reflector which is generally indicated by the numeral 120, and which is disposed in substantially covering, eccentric reflecting relation relative to the plurality of first and second electromagnetic radiation emitters 110 and 111. This multi-faceted reflector can be fabricated by utilizing standard injection molding techniques, and post, reflective coating procedures, or, in the alternative, it may be pressure or vacuum formed from deformable sheets that already have a highly reflective coating formed thereon. As depicted in FIGS. 4, 5, 6 and 7, the emitted visibly discernable electromagnetic radiation produced by the first electromagnetic radiation emitters 110 are substantially reflected by the multi-faceted reflector 120, in a first direction, by a first group of reflector facets, as will be discussed below; and the emitted electromagnetic radiation produced by the second electromagnetic radiation emitters 111 is substantially reflected by a second group of reflector facets through the primary region 61 and in a second direction. These first and second directions will be discussed in greater detail below. With regard to the multi-faceted reflector, which is generally indicated by the numeral 120, the reflector includes a reflector body 121, having a first surface which is juxtaposed relative to the second surface 92, of the second substrate 90; and an opposite second surface 123. The multi-faceted reflector 120 defines a plurality of single, discreet, reflector cavities, or pockets, 124 which are oriented in covering, eccentric reflecting relation relative to a pair of electromagnetic radiation emitters 110 and 111, respectively. Each of the reflector cavities or pockets is defined by a sidewall 125. The sidewall further defines a plurality of reflector facets 130. The sidewall is coated with a highly reflective material which facilitates the reflection of emitted visibly discernable electromagnetic radiation. The reflector facets 130 include a first group of reflector facets 131, and a second group of reflector facets 132. Each of the respective groups of reflector facets 131 or 132 may have multiple reflecting surfaces which are generally indicated by the numeral 133. The first and second group of reflector facets comprise at least two reflecting surfaces which are individually positioned in adjacent reflecting relation relative to the first and second electromagnetic radiation emitters 110 and 111, respectively. These facets may be quite distinct or smoothly blended together. As discussed above, emitted electromagnetic radiation passes outwardly through the first or primary region 61 of the semitransparent mirror 50, and in two different directions, that being a first direction 134, and a second direction 135 as best seen by reference to FIGS. 4, 5, 6 and 7, respectively. As best seen by reference to FIGS. 4 and 5, the emitted pattern of visibly discernable electromagnetic radiation traveling in the first direction 134 travels in a cone shaped pattern generally laterally, outwardly relative to the overland vehicle 11. This cone shaped pattern has a primary axis 136. Still further, the emitted electromagnetic radiation produced by the second light emitting diodes 111 travels in a cone-like pattern, in a second direction 135. This same cone shaped pattern has a primary axis which is generally indicated by the numeral 137.

As can be appreciated from a study of FIGS. 4, 5, 6 and 7, when the first group of electromagnetic radiation emitters or light emitting diodes 110 are energized, the emitted visibly discernable electromagnetic radiation is reflected by the first group of reflector facets 131, in the first direction 134, and which is laterally outwardly relative to the overland vehicle 11. Still further, when the second group of electromagnetic radiation emitters or light emitting diodes 111 are energized, the emitted electromagnetic radiation is reflected by the second group of reflector facets 132 in the second direction 135, and which is laterally downwardly relative to the overland vehicle 11 as seen in FIGS. 5 and 7, for example. As should be understood, and depending upon the position of the respective light emitting diodes, the emitted electromagnetic radiation may be reflected, if desired, in a direction which is substantially laterally inwardly relative to the overland vehicle 11 as well as downwardly. This projection pattern would be used, for example, to illuminate the side of the overland vehicle 11 in the event the operator 30 was seeking the vehicle door handle. As seen by FIG. 5 and following, the first and second directions 134 and 135 for the emitted visibly discernable electromagnetic radiation are angularly displaced one relative to the other. As will be appreciated by the drawings, the emitted electromagnetic radiation may, in one form of the invention, travel predominately along individual axes 136 and 137 which are substantially in the same plane relative to the longitudinal axis 16; or further are angularly displaced such that the individual axes 136 and 137 are in substantially different planes relative to the longitudinal axis 16. This is illustrated in FIGS. 4, 5 and 6, respectively. As seen by reference to FIG. 3, the reflector body 121 is secured in an appropriate eccentric reflecting relation relative to the second substrate 90 by way of the adhesive layer 112.

Operation

The operation of the described embodiments of the present invention are believed to be readily apparent and are briefly summarized at this point.

Figure 3:
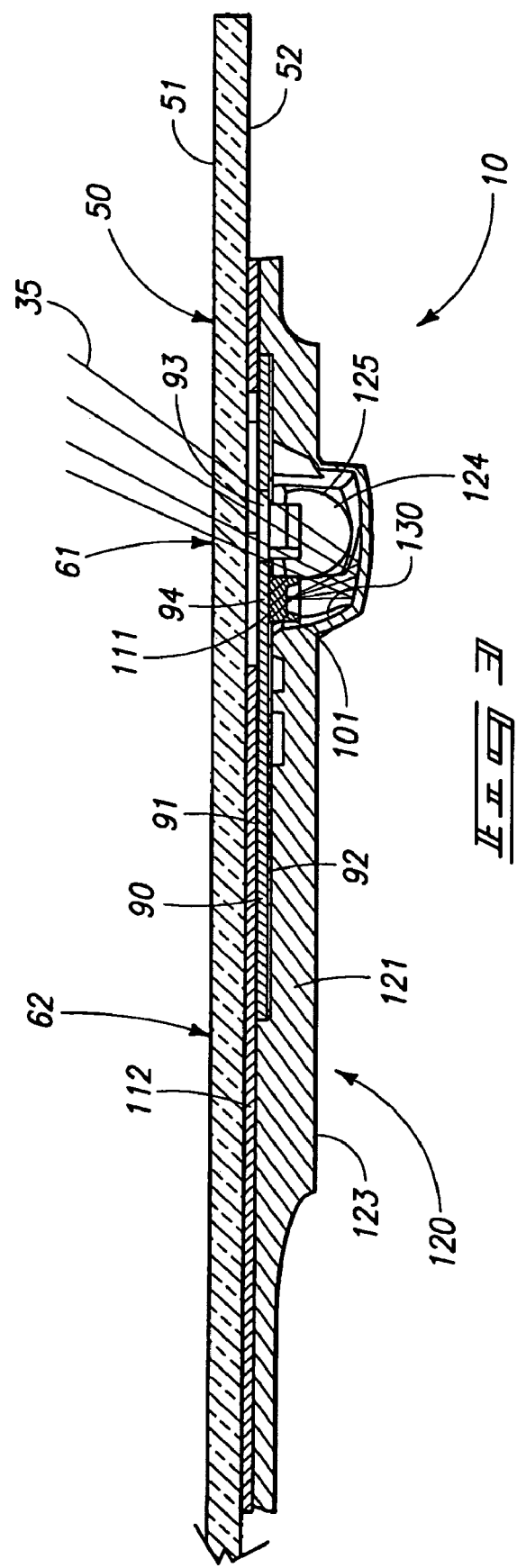
FIG. 3 is fragmentary, transverse, vertical sectional view taken through one of the reflector cavities of the electromagnetic radiation assembly of the present invention and which is shown in an assembled arrangement.

Referring now to FIG. 1 and following, an electromagnetic radiation assembly 10 of the present invention includes a supporting substrate 54 having opposite surfaces and having a region 61 through which an electromagnetic radiation signal may pass. First and second electromagnetic radiation emitters 110 and 111 are provided, and which are positioned adjacent to one of the surfaces defined by the substrate, and which, when energized, emit visibly discernable electromagnetic radiation. Still further, and as seen in FIG. 3, a single reflector 120 is disposed in covering, eccentric reflecting relation relative to the first and second electromagnetic radiation emitters 110 and 111, respectively. The emitted electromagnetic radiation produced by the first and second electromagnetic radiation emitters is reflected by the reflector 120, and passes through the supporting substrate region 61 in different directions 134 and 135, respectively. As earlier discussed, the semitransparent mirror 50 may be formed in a traditional manufacturing technique whereby a highly reflective coating 60, such as chromium, may be applied to one of the surfaces thereof to form the semitransparent mirror; or further, the semitransparent mirror may comprise a dichroic mirror 65 as seen in FIG. 10; or further, an electrochromic mirror 70 as seen in FIG. 11. The semitransparent mirror 50 as seen in the drawings has a first region 61 which passes less than about 50% of visible electromagnetic radiation and which reflects, on average, less than about 40% of visible electromagnetic radiation;

and a second region 62, which is adjacent thereto, and which passes less than about 10% of visible electromagnetic radiation, and which reflects greater than about 35% of visible electromagnetic radiation. On average, and for automotive applications, the average reflectance of the entire surface area of the semitransparent mirror 50 should typically be greater than about 35%.

In another aspect of the present invention 10, an electromagnetic radiation assembly 10 is provided, and which includes a semitransparent mirror 50 and which is defined, in part, by a supporting substrate 54 having opposite first and second surfaces 55 and 56. The supporting substrate further has a first or primary region 61, which allows visibly discernable electromagnetic radiation to pass therethrough; and a second region 62 which is adjacent to the first region 61. A reflector 120 is provided, and which is positioned adjacent to the second surface 56 of the supporting substrate, and which is oriented in a position which is adjacent to the first region 61 thereof. At least two electromagnetic radiation emitters 110 and 111, respectively, are mounted on, or adjacent to the second surface 56 of the supporting substrate 54, and which, when individually energized, emit visibly discernable electromagnetic radiation which is reflected by the reflector 120 through the first or primary region 61 of the supporting substrate 54. In the present invention 10, the energizing of one of the electromagnetic radiation emitters 110 produces visibly discernible electromagnetic radiation which is reflected, at least in part, by the reflector 120, and which passes through the first region 61, and predominately in a first direction 134. Still further, the selective energizing of the other of the two electromagnetic radiation emitters 111 emits visibly discernible electromagnetic radiation which is reflected, at least in part, by the reflector 120, and which passes through the first region 61 and predominately in a second direction 135 which is angularly displaced relative to the first direction 134. As seen in FIGS. 1, 6 and 7, the first region 61 of the semitransparent mirror 50, comprises less than a preponderance of the surface area of the supporting substrate 54, which forms a portion of the semitransparent mirror 50. However, it will be recognized that the invention 10 may be fabricated in a manner whereby the first region 61 comprises a preponderance of the surface area of the supporting substrate. As earlier discussed, the first region 61 may be formed by a number of techniques including the creation of discreet apertures 63 in given patterns as seen in FIG. 9, or further by providing a reflective coating 60 which has a thickness dimension which is less than the adjacent region that defines the second region (FIGS. 2, 3. 6. 7 and 10).

Yet a further aspect of the present invention relates to an electromagnetic radiation assembly 10 which includes a supporting substrate 54 which is formed into a semitransparent mirror 50, and which has a region 61 through which an electromagnetic radiation signal may pass. Still further a plurality of first and second electromagnetic radiation emitters 110 and 111 are positioned adjacent to one of the surfaces defined by the semitransparent mirror 50 and which, when energized, emit visibly discernable electromagnetic radiation. Still further, a multi-faceted reflector 120 is disposed in eccentric reflecting relation relative to the plurality of first and second electromagnetic radiation emitters 110 and 111, respectively. As seen in the drawings, the emitted electromagnetic radiation produced by the first electromagnetic radiation emitters is substantially reflected through the first region 61 in a first direction 134, by a first group of reflector facets 131, and the emitted electromagnetic radiation produced by the second electromagnetic radiation emitters 111 is substantially reflected by a second group of reflector facets 132 through the substrate region 61, in a second direction 135. As earlier discussed, and as seen in FIGS. 4 and 5, the visibly discernable electromagnetic radiation emitted by the first group of electromagnetic radiation emitters 110 travels generally, laterally, outwardly relative to the outside facing surface of the overland vehicle 11. Still further, the electromagnetic radiation emitted by the second group of light emitting diodes 111 travels laterally, downwardly or inwardly relative to the overland vehicle 11, thereby aiding and assisting an operator 30 or passenger as the operator/passengers are entering or existing the vehicle, or further to assist in those situations, for example, when an operator or passenger may be working adjacent to the overland vehicle such as when replacing a flat tire or the like.

As will be understood from a study of the drawings, the emitted electromagnetic radiation of the first and second light emitting diodes 110 and 111 may be of the same wavelength (and color), or may be of different wavelengths. Therefore, it will be seen that the electromagnetic radiation assembly 35 of the present invention provides many advantages over the prior art devices which have been utilized heretofore. As will be recognized, the present assembly 10 is compact, cost efficient, and further, provides a convenient means whereby visibly discernable electromagnetic radiation may be projected in various patterns relative to the overland vehicle to aid and assist the operator in the use of the overland vehicle.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An electromagnetic radiation assembly, comprising:
a supporting substrate which is substantially transparent and/or translucent and having opposite surfaces and having a region through which an electromagnetic radiation signal may pass;
first and second electromagnetic radiation emitters positioned adjacent to one of the surfaces defined by the supporting substrate, and which, when energized, emit electromagnetic radiation; and
a single multifaceted reflector disposed in eccentric reflecting relation relative to the first and second electromagnetic radiation emitters, and wherein at least some of the reflector facets have multiple reflecting surfaces, and wherein the emitted electromagnetic radiation produced by the first and second electromagnetic radiation emitters is reflected by the single multifaceted reflector and passes through the supporting substrate region which passes electromagnetic radiation in different directions.

2. An electromagnetic radiation assembly as claimed in claim 1, and further comprising:
a second substrate juxtaposed relative to the supporting substrate, and which has an electrically conductive pathway formed thereon, and wherein the first and second electromagnetic radiation emitters are mounted on the second substrate, and electrically coupled with the electrical pathway.

3. An electromagnetic radiation assembly as claimed in claim 2, and wherein the second substrate defines a region which allows emitted electromagnetic radiation to pass therethrough.

4. An electromagnetic radiation assembly as claimed in claim 3, and wherein the region which is defined by the second substrate comprises an aperture which is substantially aligned with the single multifaceted reflector.

5. An electromagnetic radiation assembly as claimed in claim 2, and wherein an electrically actuated heater is mounted on the second substrate and is operable, when energized, to impart heat energy to the substantially transparent and/or translucent supporting substrate.

6. An electromagnetic radiation assembly as claimed in claim 1, and wherein the substantially transparent and/or translucent supporting substrate is a semitransparent mirror which has opposite first and second surfaces.

7. An electromagnetic radiation assembly as claimed in claim 1, and wherein the substantially transparent and/or translucent supporting substrate comprises a mirror, and wherein the region which passes electromagnetic radiation comprises a first region which passes less than about 50% of visible electromagnetic radiation, and which reflects on average less than about 40% of visible electromagnetic radiation; and wherein the mirror further includes a second region, which is adjacent to the first region, and which passes less than about 10% of visible electromagnetic radiation, and which reflects greater than about 35% of visible electromagnetic radiation.

8. An electromagnetic radiation assembly as claimed in claim 1, and wherein the substantially transparent and/or translucent supporting substrate is a dichroic mirror.

9. An electromagnetic radiation assembly as claimed in claim 6, and wherein the first and second electromagnetic radiation emitters are mounted on one of the first or second surfaces of the substantially transparent and/or translucent supporting substrate.

10. An electromagnetic radiation assembly as claimed in claim 9, and wherein an electrically conductive pathway is formed on one of the first or second surfaces of the semi-transparent mirror, and wherein the electromagnetic radiation emitters are electrically coupled to the electrically conductive pathway.

11. An electromagnetic radiation assembly as claimed in claim 6, and wherein the first and second electromagnetic radiation emitters are mounted on a circuit board which is juxtaposed relative to one of the first or second surfaces of the semitransparent mirror.

12. An electromagnetic radiation assembly as claimed in claim 6, and wherein the first and second electromagnetic radiation emitters are mounted on a flexible substrate which is positioned in juxtaposed relation relative to one of the first or second surfaces of the semitransparent mirror.

13. An electromagnetic radiation assembly as claimed in claim 1, and wherein the respective electromagnetic radiation emitters emit visible electromagnetic radiation having substantially the same wavelengths.

14. An electromagnetic radiation assembly as claimed in claim 1, and wherein the electromagnetic radiation emitters emit electromagnetic radiation having different wavelengths.

15. An electromagnetic radiation assembly as claimed in claim 1, and wherein the emitted electromagnetic radiation passes through the substantially transparent and/or translucent supporting substrate in more than two directions.

16. An electromagnetic radiation assembly as claimed in claim 1, and wherein the multiple reflecting surfaces of the single multifaceted reflector reflects the emitted electromagnetic radiation produced by the first and second electromagnetic radiation emitters in at least two different directions.

17. An electromagnetic radiation assembly as claimed in claim 1, and wherein the electromagnetic radiation assembly is mounted in a housing of an exterior mirror, and wherein the exterior mirror is further mounted on an outside surface of an overland vehicle, and wherein the first electromagnetic radiation emitter, when energized, emits electromagnetic radiation which passes through the substantially transparent and/or translucent supporting substrate, and which travels in a direction which is generally laterally, outwardly, relative to the outside facing surface of the overland vehicle, and wherein the second electromagnetic radiation emitter, when energized, emits electromagnetic radiation which passes through the substantially transparent and/or translucent supporting substrate and which travels in a direction which is substantially laterally, inwardly and towards the outside facing surface of the overland vehicle.

18. An electromagnetic radiation assembly comprising:
an electrochromic mirror having opposite first and second surfaces, and having a first region which allows electromagnetic radiation to pass therethrough, and a second region adjacent to the first region;
a multifaceted reflector positioned adjacent to the second surface of the supporting substrate and oriented in a position which is adjacent to the first region, and wherein at least some of the reflector facets have multiple reflecting surfaces; and
at least two electromagnetic radiation emitters positioned adjacent to the second surface of the electrochromic mirror, and which, when individually energized, emit electromagnetic radiation which is reflected by the multifaceted reflector through the first region of the electrochromic mirror, and wherein the energizing of one of the electromagnetic radiation emitters produces visibly discernible electromagnetic radiation which is reflected, at least in part, by the multifaceted reflector, and which passes through the first region and predominately in a first direction, and wherein energizing of the other of the two electromagnetic radiation emitters emits visibly discernible electromagnetic radiation which is reflected, at least in part, by the multifaceted reflector, and which passes through the first region and predominately in a second direction which is angularly displaced relative to the first direction.

19. An electromagnetic radiation assembly as claimed in claim 18, and wherein the first region of the electrochromic mirror is operable to pass less than about 50% of visible electromagnetic radiation, and which further reflects on average, less than about 40% of all visible electromagnetic radiation, and wherein the second region of the supporting substrate passes less than about 10% of visible electromagnetic radiation and which reflects greater than about 35% of visible electromagnetic radiation.

20. An electromagnetic radiation assembly as claimed in claim 18, and wherein the electrochromic mirror has a surface area, and wherein the first region comprises a preponderance of the surface area of the electrochromic mirror.

21. An electromagnetic radiation assembly as claimed in claim 18, and wherein the electrochromic mirror has a surface area, and wherein the first region comprises less than a preponderance of the surface area of the supporting substrate.

22. An electromagnetic radiation assembly as claimed in claim 18, and further comprising a circuit substrate mounted in juxtaposed relation relative to the second surface of the electrochromic mirror, and wherein the electromagnetic radiation emitters are borne by, and electrically coupled to the circuit substrate.

23. An electromagnetic radiation assembly as claimed in claim 18, and wherein the multifaceted reflector is mounted in substantially eccentric covering relation relative to the respective electromagnetic radiation emitters.

24. An electromagnetic radiation assembly as claimed in claim 23, and wherein the emitted electromagnetic radiation traveling in the angularly displaced first and second directions is directed predominately along individual axes which are substantially in the same plane.

25. An electromagnetic radiation assembly as claimed in claim 23, and wherein the emitted electromagnetic radiation traveling in the angularly displaced first and second directions is directed predominately along individual axes which are substantially in different planes.

26. An electromagnetic radiation assembly, comprising:
   a supporting substrate having opposite surfaces, and having a region through which an electromagnetic radiation signal may pass;
   a plurality of first and second electromagnetic radiation emitters positioned adjacent to one of the surfaces defined by the supporting substrate and which, when energized, emit electromagnetic radiation; and
   a multi-faceted reflector disposed in eccentric reflecting relation relative to the plurality of first and second electromagnetic radiation emitters, and wherein the emitted electromagnetic radiation produced by the first electromagnetic radiation emitters is substantially reflected through the substrate region in a first direction by a first group of reflector facets, and the emitted electromagnetic radiation produced by the second electromagnetic radiation emitters is substantially reflected by a second group of reflector facets through the substrate region in a second direction, and wherein at least one of the first and/or second group of reflector facets have multiple reflecting surfaces.

27. An electromagnetic radiation assembly as claimed in claim 26, and wherein the reflector is defined by a sidewall, and wherein the sidewall defines a cavity, and wherein the first and second electromagnetic radiation emitters are received in the cavity.

28. An electromagnetic radiation assembly as claimed in claim 26, and wherein the supporting substrate is substantially transparent, and a reflective layer is deposited on one of the opposite surfaces thereof, and which forms a semi-transparent mirror, and wherein the electromagnetic radiation emitters are mounted adjacent to the supporting substrate.

29. An electromagnetic radiation assembly as claimed in claim 26, and wherein the electromagnetic radiation assembly is mounted on an outside surface of an overland vehicle, and wherein the first group of reflector facets reflects electromagnetic radiation emitted by the first electromagnetic radiation emitters in the first direction and which is laterally, outwardly relative to the overland vehicle.

30. An electromagnetic radiation assembly as claimed in claim 29, and wherein the second group of reflector facets reflects electromagnetic radiation emitted by the second group of electromagnetic radiation emitters in a direction which is laterally, downwardly relative to the overland vehicle.

31. An electromagnetic radiation assembly as claimed in claim 29, and wherein the second group of reflector facets emits electromagnetic radiation emitted by the second group of electromagnetic radiation emitters in a direction which is laterally, inwardly relative to the overland vehicle.

* * * * *

UNITED STATES PATENT AND TRADEMARK OFFICE
CERTIFICATE OF CORRECTION

PATENT NO. : 7,008,091 B2  Page 1 of 1
APPLICATION NO. : 10/741748
DATED : March 7, 2006
INVENTOR(S) : Daniel J. Mathieu It is certified that error appears in the above-identified patent and that said Letters Patent is hereby corrected as shown below:

TITLE PAGE:

Please replace "(12) United States Patent

Mathleu et al." with

--(12) United States Patent

Mathieu et al.--.

Please replace "(75) Inventors: Daniel J. Mahleu" with

--(75) Inventors: Daniel J. Mathieu--.

Signed and Sealed this

Twenty-first Day of August, 2007

JON W. DUDAS
*Director of the United States Patent and Trademark Office*